US012636973B2

(12) United States Patent
Akabori et al.

(10) Patent No.: US 12,636,973 B2
(45) Date of Patent: May 26, 2026

(54) FUEL CELL SYSTEM

(71) Applicant: HONDA MOTOR CO., LTD., Tokyo (JP)

(72) Inventors: Sho Akabori, Wako (JP); Takuto Nakagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 604 days.

(21) Appl. No.: 18/125,342

(22) Filed: Mar. 23, 2023

(65) Prior Publication Data

US 2023/0311714 A1       Oct. 5, 2023

(30) Foreign Application Priority Data

Mar. 30, 2022     (JP) ................................. 2022-055053

(51) Int. Cl.
*B60L 58/40*          (2019.01)
*B60L 50/75*          (2019.01)
(Continued)

(52) U.S. Cl.
CPC ............... *B60L 58/40* (2019.02); *B60L 50/75* (2019.02); *H01M 8/04089* (2013.01); *H01M 8/04201* (2013.01); *H01M 8/0432* (2013.01); *H01M 8/04671* (2013.01); *H01M 8/04753* (2013.01); *H01M 8/04932* (2013.01);
(Continued)

(58) Field of Classification Search
CPC .......... B60L 58/40; B60L 58/32; B60L 50/75; B60L 2240/545; B60L 3/0053; H01M 8/04201; H01M 8/0432; H01M 8/04671; H01M 8/04753; H01M 8/04932; H01M 8/04947; H01M 8/04955; H01M 8/04225; H01M 8/04298; H01M 8/04302;
(Continued)

(56) References Cited

U.S. PATENT DOCUMENTS

| | | | | | |
|---|---|---|---|---|---|
| 2006/0272868 | A1* | 12/2006 | Fuse | ....................... | B60L 58/33 |
| | | | | | 180/65.1 |
| 2010/0167142 | A1* | 7/2010 | Saito | ................. | H01M 8/04225 |
| | | | | | 429/429 |
| 2016/0380287 | A1* | 12/2016 | Kaneko | ............... | H01M 8/0494 |
| | | | | | 429/429 |

FOREIGN PATENT DOCUMENTS

| | | |
|---|---|---|
| JP | 2005-073475 A | 3/2005 |
| JP | 2008-072796 A | 3/2008 |

(Continued)

OTHER PUBLICATIONS

Office Action dated Oct. 31, 2023 issued in the corresponding Japanese Patent Application No. 2022-055053 with the English machine translation thereof.

(Continued)

*Primary Examiner* — Matthew W Van Oudenaren

(74) *Attorney, Agent, or Firm* — Carrier, Shende & Associates P.C.; Fulchand P. Shende; Joseph P. Carrier

(57) ABSTRACT

A fuel cell system includes a fuel cell and a secondary battery used as power sources of a power supply target object, and a control device for controlling driving of the power supply target object. The control device determines whether a predetermined condition required for activation of the fuel cell is satisfied, permits a battery-driven mode in which the power supply target object is driven using only the secondary battery when the predetermined condition is satisfied, and prohibits the battery-driven mode when the predetermined condition is not satisfied.

5 Claims, 5 Drawing Sheets

(51) Int. Cl.
| | |
|---|---|
| *H01M 8/04082* | (2016.01) |
| *H01M 8/04089* | (2016.01) |
| *H01M 8/0432* | (2016.01) |
| *H01M 8/04664* | (2016.01) |
| *H01M 8/04746* | (2016.01) |
| *H01M 8/04858* | (2016.01) |
| *H01M 16/00* | (2006.01) |

(52) U.S. Cl.
CPC ..... *H01M 8/04947* (2013.01); *H01M 16/006* (2013.01); *B60L 2240/545* (2013.01); *H01M 2220/20* (2013.01); *H01M 2250/20* (2013.01)

(58) Field of Classification Search
CPC ........... H01M 8/04328; H01M 16/006; H01M 2220/20; H01M 2250/20
See application file for complete search history.

(56) References Cited

FOREIGN PATENT DOCUMENTS

| | | | |
|---|---|---|---|
| JP | 2008-271655 | A | 11/2008 |
| JP | 2009-259518 | A | 11/2009 |
| JP | 2017-016746 | A | 1/2017 |

OTHER PUBLICATIONS

Office Action dated Aug. 20, 2024 issued in Japanese Patent Application No. 2024-023356, which is a divisional application of the corresponding Japanese Patent Application No. 2022-055053, with the English machine translation thereof.

* cited by examiner

FUEL CELL SYSTEM

CROSS-REFERENCE TO RELATED APPLICATIONS

This application is based upon and claims the benefit of priority from Japanese Patent Application No. 2022-055053 filed on Mar. 30, 2022, the contents of which are incorporated herein by reference.

BACKGROUND OF THE INVENTION

Field of the Invention

The present invention relates to a fuel cell system to be mounted on a moving object or the like as a target to be supplied with electric power.

Description of the Related Art

In recent years, research and development have been conducted on fuel cells that contribute to energy efficiency in order to ensure that more people have access to affordable, reliable, sustainable and modern energy.

JP 2008-271655 A discloses a fuel cell system mounted on a moving object. The fuel cell system includes a fuel cell and a battery. The control device of the fuel cell system allows the moving object to travel only after the activation of the battery is completed and the activation of the traveling functions is completed.

SUMMARY OF THE INVENTION

In JP 2008-271655 A, the state of the fuel cell is not taken into consideration when allowing the moving object to travel.

An object of the present invention is to solve the aforementioned problem.

According to an aspect of the present invention, there is provided a fuel cell system including: a fuel cell and a secondary battery used as power sources for a power supply target object; and a control device configured to control driving of the power supply target object, wherein the control device determines whether a predetermined condition required for activation of the fuel cell is satisfied, permits a battery-driven mode in which the power supply target object is driven using only the secondary battery when the predetermined condition is satisfied, and prohibits the battery-driven mode when the predetermined condition is not satisfied.

According to the present invention, the fuel cell can be started up when necessary. Therefore, convenience to the use after the power supply target object starts to be driven can be enhanced.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a flowchart showing a procedure of condition confirmation processing;

DETAILED DESCRIPTION OF THE INVENTION

1. Configuration of Fuel Cell System 10

Figure 1:
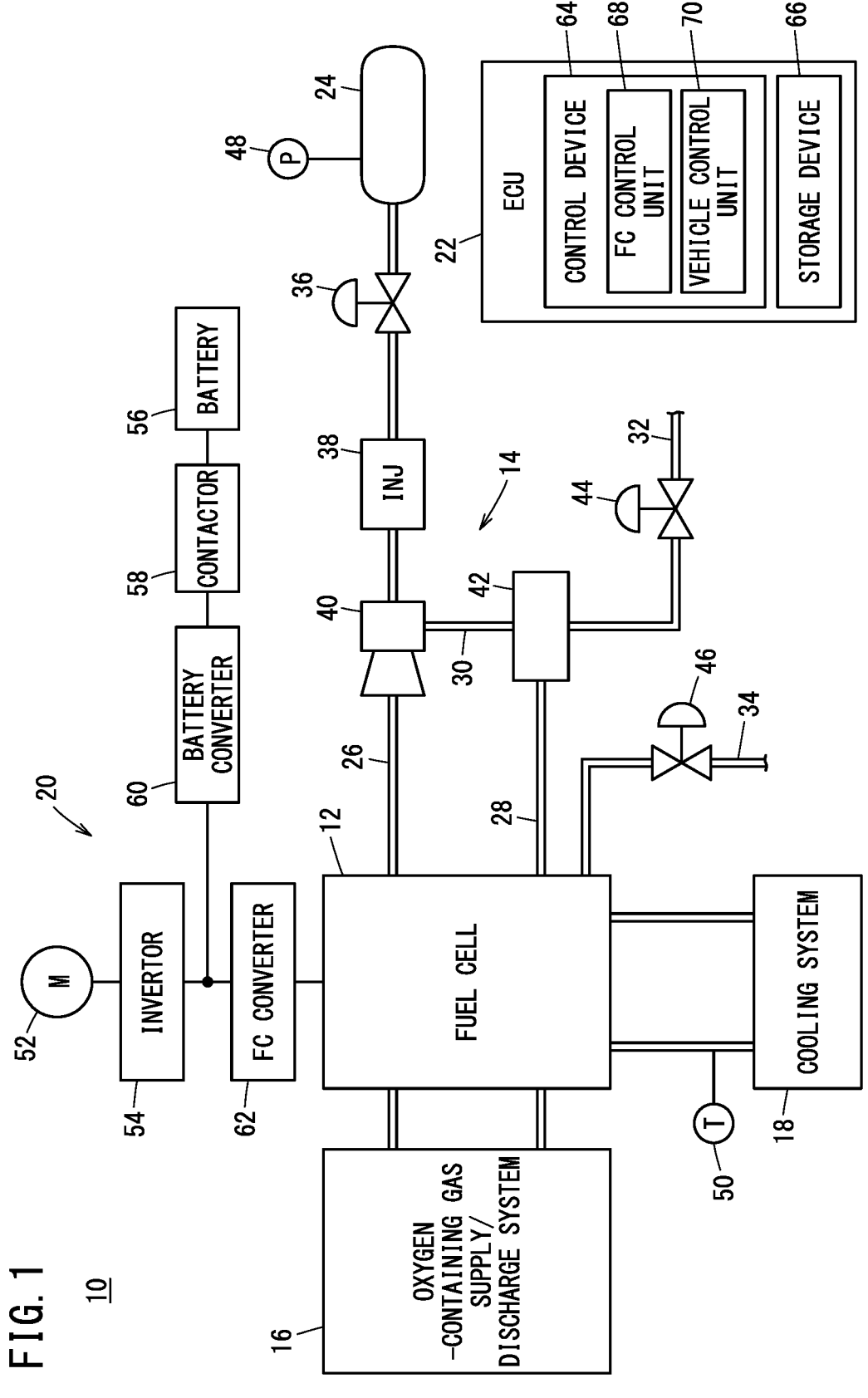
FIG. 1 is a schematic diagram of a fuel cell system according to an embodiment.

FIG. 1 is a schematic diagram illustrating a fuel cell system 10 according to the present invention. The fuel cell system 10 is mounted on a vehicle. The fuel cell system 10 can be used in any moving objects (automobiles, ships, aircrafts, and the like), industrial machines, and the like. Thus, the fuel cell system 10 contributes to energy efficiency.

The fuel cell system 10 includes a fuel cell 12, a fuel gas supply/discharge system 14, an oxygen-containing gas supply/discharge system 16, a cooling system 18, a power system 20, and at least one ECU 22.

The fuel cell 12 may be a fuel cell stack including a plurality of power generation cells stacked. Each of the power generation cells includes a solid polymer electrolyte membrane, an anode, and a cathode. In the power generation cell, a cathode flow field for supplying an oxygen-containing gas to the cathode is formed. In the power generation cell, an anode flow field for supplying a fuel gas to the anode is formed. The fuel cell 12 generates electric power by reactions between the fuel gas (hydrogen gas) and the oxygen-containing gas (air).

The fuel gas supply/discharge system 14 includes components for supplying the fuel gas to the anode of the fuel cell 12 and components for discharging the fuel off-gas from the anode of the fuel cell 12. The fuel gas supply/discharge system 14 includes a gas tank (gas container) 24. The fuel gas supply/discharge system 14 includes a supply flow path (passage) 26, a discharge flow path 28, a circulation flow path 30, a first drain channel 32, and a second drain channel 34. The fuel gas supply/discharge system 14 also includes a tank valve 36, an injector 38, an ejector 40, a gas-liquid separator 42, a first drain valve 44, and a second drain valve 46.

The supply flow path 26 connects the outlet of the gas tank 24 to the inlet of the anode flow field of the fuel cell 12. In the supply flow path 26, the tank valve 36, the injector 38, and the ejector 40 are provided in this order from the upstream side (the gas tank 24) toward the downstream side (the fuel cell 12). The gas tank 24 stores the fuel gas at high pressure. The gas tank 24 is provided with a pressure sensor 48. The pressure sensor 48 detects the internal pressure of the tank. The pressure sensor 48 transmits a detection value to a control device 64 in the ECU 22. The detection value of the pressure sensor 48 correlates with the remaining amount of the fuel gas in the gas tank 24. The tank valve 36 is a solenoid valve.

The discharge flow path 28 connects the outlet of the anode flow field of the fuel cell 12 to the inlet of the gas-liquid separator 42. The circulation flow path 30 connects a gas outlet of the gas-liquid separator 42 to the ejector 40. The first drain channel 32 connects a liquid outlet of the gas-liquid separator 42 to the diluter (not shown). The first drain channel 32 is provided with the first drain valve 44. The first drain valve 44 is the solenoid valve. The second drain channel 34 connects a liquid outlet of the fuel cell 12 to the diluter (not shown). The second drain channel 34 is provided with the second drain valve 46. The second drain valve 46 is a solenoid valve.

The oxygen-containing gas supply/discharge system 16 includes components for supplying the oxygen-containing gas to the cathode of the fuel cell 12 and components for discharging the oxygen-containing off-gas from the cathode of the fuel cell 12.

The cooling system 18 includes components for supplying the coolant to the fuel cell 12, and components for discharging the coolant from the fuel cell 12. The cooling system 18 is provided with a temperature sensor (temperature acquisition device) 50. The temperature sensor 50 detects the temperature of the coolant discharged from the fuel cell 12. The temperature sensor 50 transmits a detection value to the control device 64 in the ECU 22. The detection value of the temperature sensor 50 correlates with the internal temperature of the fuel cell 12.

The power system 20 includes components for supplying electric power to one or more loads mounted on the vehicle. The power system 20 includes a motor (power supply target object) 52, an inverter 54, a battery (secondary battery) 56, a contactor 58, a battery converter 60, and an FC converter 62.

The motor 52 is a traction motor for running the vehicle. The motor 52 can be operated by electric power supplied from the fuel cell 12 via the FC converter 62 and the inverter 54. The motor 52 can be operated by electric power supplied from the battery 56 via the contactor 58, the battery converter 60, and the inverter 54.

The battery 56 is a high-voltage secondary battery. The battery 56 is a power source of the motor 52, like the fuel cell 12. The battery 56 may provide power to the motor 52. The battery 56 can be charged with the electric power generated by the motor 52 or the electric power generated by the fuel cell 12.

The FC converter 62 is a step-up DC/DC converter. The battery converter 60 is a step-up/step-down DC/DC converter.

The at least one ECU 22 includes a control device 64 and a storage device 66. The control device 64 includes a processing circuit. The processing circuit may be a processor such as a CPU or the like. The processing circuit may be an integrated circuit such as an ASIC, an FPGA, or the like. The processor is capable of executing various processes by executing programs stored in the storage device 66. The control device 64 functions as an FC control unit 68 and a vehicle control unit 70. At least a portion from among a plurality of processes may be performed by an electronic circuit including a discrete device.

The FC control unit 68 controls the operation of the fuel cell 12. For example, the FC control unit 68 controls the fuel gas supply/discharge system 14, the oxygen-containing gas supply/discharge system 16, and the cooling system 18. For example, the FC control unit 68 outputs a control signal to each of the tank valve 36, the first drain valve 44, the second drain valve 46, and the injector 38 to control the operations thereof.

The vehicle control unit 70 controls traveling of the vehicle. For example, the vehicle control unit 70 controls power system 20. For example, the vehicle control unit 70 outputs a control signal to each of the switch elements of the inverter 54, the contactor 58, each of the switch elements of the battery converter 60, and each of the switch elements of the FC converter 62, and controls the operations thereof.

The storage device 66 includes a volatile memory and a non-volatile memory. Examples of the volatile memory include a RAM (Random Access Memory) or the like. The volatile memory is used as a working memory of the processor. In the volatile memory, data and the like required for carrying out processing or computations are temporarily stored therein. Examples of the nonvolatile memory include a ROM (Read Only Memory), a flash memory, and the like. Such a non-volatile memory is used as a storage memory. Programs, tables, and maps, and the like are stored in the non-volatile memory. At least part of the storage device 66 may be provided in the processor, the integrated circuit, etc. as described above.

2. Activation Processing

Figure 2:
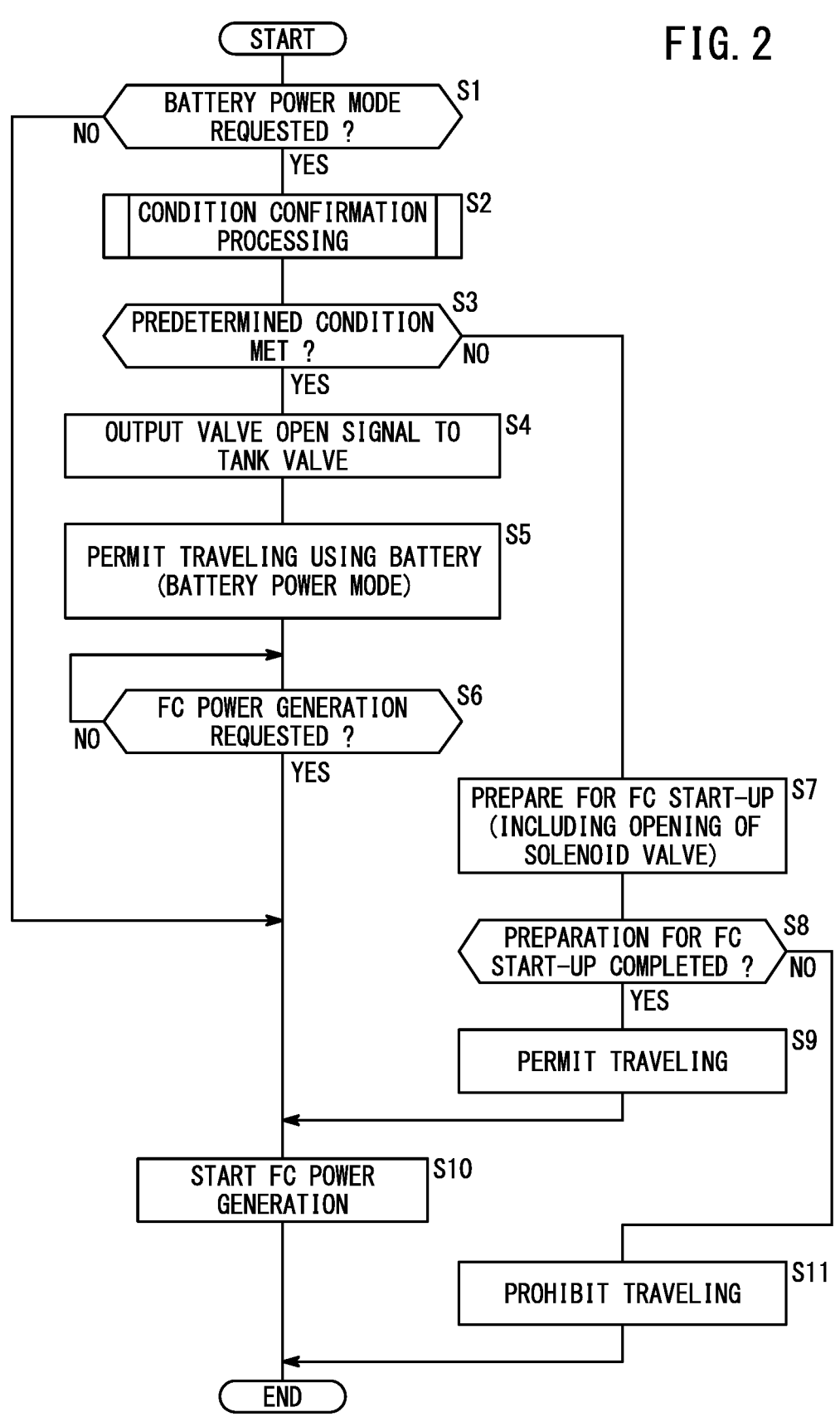
FIG. 2 is a flowchart showing a procedure of activation processing.

FIG. 2 is a flowchart showing a procedure of activation processing. The control device 64 performs the activation processing shown in FIG. 2 when the vehicle is activated. For example, the user activates the vehicle by simultaneously performing an operation to press a brake pedal and an operation of a start/stop button. The control device 64 starts the activation processing shown in FIG. 2 when the operation to press the brake pedal and the operation of the start/stop button are detected in a state where the vehicle is stopped.

The vehicle control unit 70 prepares for traveling when detecting the operation to press the brake pedal and the operation of the start/stop button. For example, the vehicle control unit 70 connects the contactor 58. In addition, the vehicle control unit 70 confirms that the battery converter 60 and the FC converter 62 are activated. After the contactor 58 is connected, the vehicle control unit 70 outputs a request for a battery power mode (battery-driven mode) to the FC control unit 68.

The battery power mode is a travel mode in which the vehicle can travel using only electric power from the battery 56 at least until electric power from the fuel cell 12 becomes available. When the state of the fuel cell 12 is changed from the stopped state to the operating state, for example, at the time of activation of the vehicle, it takes some time until the electric power from the fuel cell 12 becomes available. Therefore, the vehicle cannot travel by using the electric power from the fuel cell 12 immediately after the vehicle is started. On the other hand, if the battery power mode is permitted, the vehicle can start moving earlier.

In step S1, the FC control unit 68 determines whether or not there is a request for the battery power mode. If the battery power mode is requested (step S1: YES), the process proceeds to step S2. On the other hand, when there is no request for the battery power mode (step S1: NO), the process proceeds to step S10.

When the process proceeds from step S1 to step S2, the FC control unit 68 performs condition confirmation processing. In the condition confirmation processing, the FC control unit 68 confirms at least one condition (predetermined condition) under which the vehicle may be allowed to travel using the battery 56. The condition confirmation processing will be described in the section of "3. Condition Confirmation Processing" below. When the process of step S2 is completed, the process transitions to step S3.

In step S3, the FC control unit 68 determines whether the at least one predetermined condition is met on the basis of the result of step S2. When the at least one predetermined condition is met (step S3: YES), the process proceeds to step S4. On the other hand, when the at least one predetermined condition is not met (step S3: NO), the process proceeds to step S7.

When the process proceeds from step S3 to step S4, the FC control unit 68 outputs a valve-opening signal to the tank valve 36. The tank valve 36 starts a valve opening operation in accordance with the valve opening signal. It takes some time from the start of the valve opening operation of the tank valve 36 to the completion of the valve opening. As the tank valve 36 opens, the fuel gas in the gas tank 24 flows toward the injector 38. After completion of the valve opening operation of the tank valve 36, the fuel gas can be injected from the injector 38 toward the fuel cell 12.

In step S5, the FC control unit 68 permits the battery power mode. That is, the FC control unit 68 permits the vehicle to travel using the battery 56. For example, the FC control unit 68 outputs, to the vehicle control unit 70, information indicating that traveling using the battery 56 is permitted. The FC control unit 68 displays a message (preparation completed or the like) to the user, for example, on a display device provided in a driver's compartment of the vehicle. Although step S5 is performed after step S4 in the flowchart shown in FIG. 2, step S4 and step S5 are performed simultaneously. That is, the FC control unit 68 simultaneously outputs the valve opening signal and permits the battery power mode. When the process of steps S4 and S5 are completed, the process transitions to step S6.

In step S6, the FC control unit 68 determines whether or not there is an FC power generation (power generation by the fuel cell 12) is requested. For example, when the SOC of the battery 56 decreases to a predetermined value or less, the vehicle control unit 70 makes a request for the FC power generation to the FC control unit 68. In addition, the vehicle control unit 70 requests the FC control unit 68 for the FC power generation, for example, when a large amount of electric power is required (when the user presses down the accelerator pedal or the like). In the case of the FC power generation request (step S6: YES), the process proceeds to step S10. On the other hand, in the case of no FC power generation request (step S6: NO), the process of step S6 is repeatedly executed. That is, the FC control unit 68 continues the battery power mode until the FC power generation is required.

When the process proceeds from step S3 to step S7, the FC control unit 68 prepares to start up the fuel cell 12. As in step S4, the FC control unit 68 outputs a valve-opening signal to the tank valve 36. The FC control unit 68 checks the remaining amount of the fuel gas in the gas tank 24 based on the detection value of the pressure sensor 48. When the process of step S7 is completed, the process transitions to step S8.

In step S8, the FC control unit 68 determines whether or not the fuel cell 12 is ready to start up. The FC control unit 68 determines that the startup preparation is completed when confirming a state in which the fuel cell 12 can be started up or a state in which the vehicle may be driven using the electric power from the fuel cell 12. The FC control unit 68 determines that the fuel cell 12 is in the state in which the fuel cell 12 can be started up, for example, when the tank valve 36 is confirmed to be opened. For example, in the case where it is confirmed that the gas is not running out, the FC control unit 68 determines that the vehicle is in the state in which the vehicle may be driven using the electric power from the fuel cell 12. In this case (step S8: YES), the process proceeds to step S9. On the other hand, the FC control unit 68 determines that the startup preparation is not completed when it is confirmed that the fuel cell 12 cannot be started up or that it is not preferable to make the vehicle travel using the electric power from the fuel cell 12. In this case (step S8: NO), the process proceeds to step S11.

When the process proceeds from step S8 to step S9, the FC control unit 68 permits the vehicle to travel. For example, the FC control unit 68 outputs information indicating that traveling using the fuel cell 12 is permitted, to the vehicle control unit 70. The FC control unit 68 displays a message (preparation completed or the like) to the user, for example, on the display device provided in the driver's compartment of the vehicle. When the process of step S9 is completed, the process transitions to step S10.

When the process proceeds to step S10 from step S6 or from step S9, the FC control unit 68 starts power generation by the fuel cell 12. The FC control unit 68 controls each device of the fuel gas supply/discharge system 14 to control the supply of the fuel gas to the fuel cell 12 and the discharge of the fuel off-gas from the fuel cell 12. The FC control unit 68 controls each device of the oxygen-containing gas supply/discharge system 16 to control the supply of the oxygen-containing gas to the fuel cell 12 and the discharge of the oxygen-containing off-gas from the fuel cell 12. The FC control unit 68 controls each device of the cooling system 18 to control the supply of the coolant to the fuel cell 12 and the discharge of the coolant from the fuel cell 12. After execution of step S10, the activation processing is brought to an end.

When the process proceeds from step S8 to step S11, the FC control unit 68 prohibits (disallows) the traveling of the vehicle. For example, the FC control unit 68 outputs information indicating that traveling using the fuel cell 12 is prohibited to the vehicle control unit 70. The FC control unit 68 displays a message (traveling not possible or the like) to the user, for example, on the display device provided in the driver's compartment of the vehicle. After execution of step S11, the activation processing is brought to an end.

3. Condition Confirmation Processing

Figure 3:
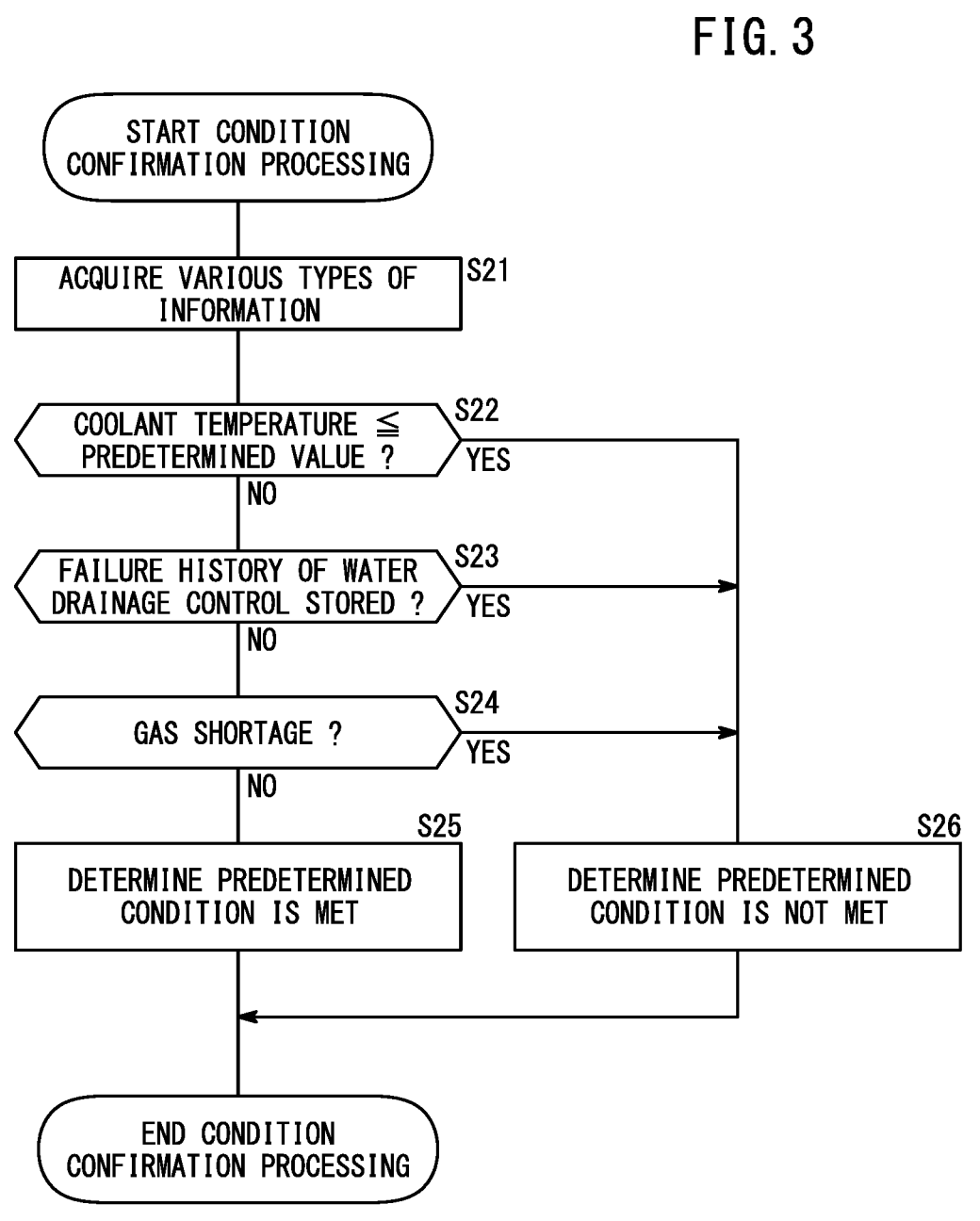

FIG. 3 is a flowchart showing a procedure of condition confirmation processing. At step S2 of the activation processing shown in FIG. 2, the FC control unit 68 executes condition confirmation processing shown in FIG. 3. In FIG. 3, three conditions (step S22, step S23, and step S24) are shown as the predetermined conditions checked by the FC control unit 68. The FC control unit 68 may check only one of them. Further, the FC control unit 68 may check other conditions as the predetermined condition.

In step S21, the FC control unit 68 acquires various types of information. The FC control unit 68 acquires a detection value of the coolant temperature from the temperature sensor 50. The FC control unit 68 retrieves a history of a maintenance control from the storage device 66. The FC control unit 68 acquires a detection value of the internal pressure of the gas tank 24 from the pressure sensor 48. When the process of step S21 is completed, the process transitions to step S22.

In step S22, the FC control unit 68 compares a coolant temperature with a predetermined value. The predetermined value is a threshold of the coolant temperature and stored in the storage device 66. When the coolant temperature is equal to or lower than the predetermined value, it takes time to warm the fuel cell 12 up. That is, it takes time until the fuel cell 12 becomes usable (until the power generation becomes stable). In this case (step S22: YES), the process proceeds to step S26. On the other hand, when the coolant temperature exceeds the predetermined value, the warming-up of the fuel cell 12 is completed in a short time. In other words, it does not take time until the fuel cell 12 becomes usable. In this case (step S22: NO), the process proceeds to step S23.

When the process proceeds from step S22 to step S23, the FC control unit 68 determines whether there is a failure history of the maintenance control. The maintenance control is a control performed while the fuel cell 12 is stopped. Examples of the maintenance control include a water drainage control. The FC control unit 68 monitors the temperature of the fuel cell 12 while the fuel cell 12 is stopped. For example, the FC control unit 68 monitors the coolant temperature based on the detection value of the temperature sensor 50. The FC control unit 68 opens the second drain valve 46 when the coolant temperature decreases to a predetermined drain temperature or lower. Then, the water accumulated inside the fuel cell 12 flows through the second drain channel 34 and is discharged to the outside of the fuel cell 12. Thus, freezing of water in the fuel cell 12 is prevented. The FC control unit 68 stores an execution history and an execution result (success or failure) of the water drainage control in the storage device 66.

The failure history included in the execution history of the water drainage control may indicate some abnormality in the fuel cell system 10. In this case (step S23: YES), the process transitions to step S26. On the other hand, in the case of no failure history included in the execution history of the water drainage control (step S23: NO), the process proceeds to step S24.

When the process proceeds from step S23 to step S24, the FC control unit 68 checks the remaining amount of the fuel gas in the gas tank 24 based on the detection value of the pressure sensor 48. The detected value of the pressure sensor 48 is equal to or less than a predetermined pressure, the FC control unit 68 determines that there is a gas shortage. In the case of gas shortage (step S24: YES), the process proceeds to step S26. On the other hand, if the gas is not running out (step S24: NO), the process proceeds to step S25.

When the process proceeds from step S24 to step S25, the FC control unit 68 determines that the predetermined condition is satisfied. On the other hand, when the process proceeds to step S26 from any one of step S22, step S23, and step S24, the FC control unit 68 determines that the predetermined condition is not satisfied. When the process of step S25 or step S26 is completed, the process transitions to step S3 in FIG. 2.

As described above, the FC control unit 68 may check another condition as the predetermined condition. For example, the activation time taken by the fuel cell 12 may be predicted, and the predetermined condition may be determined to be satisfied if the activation time is equal to or shorter than a predetermined time.

4. Processing Example

4-1. Processing Example 1

Figure 4:
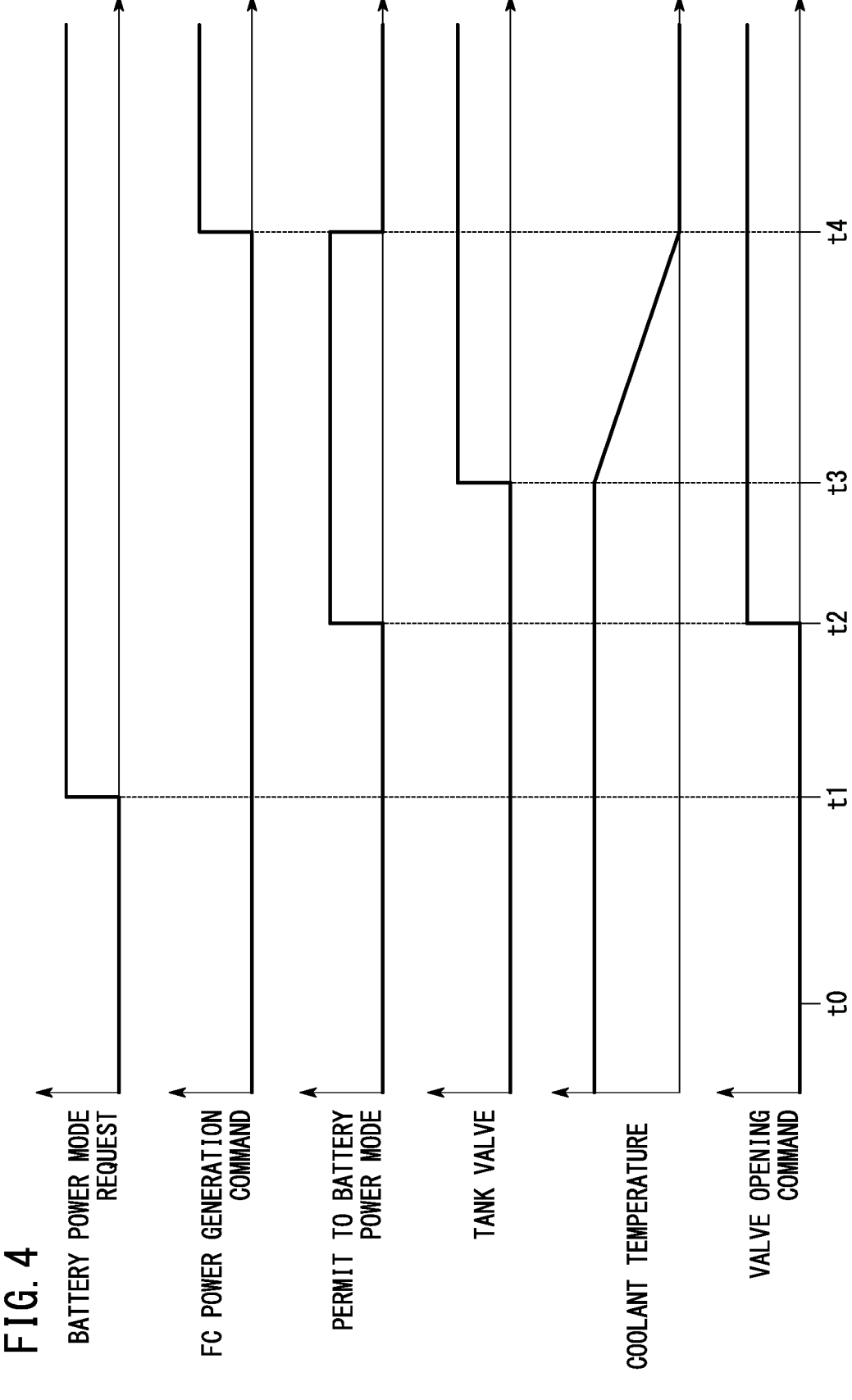
FIG. 4 is a time chart illustrating an example of processing performed in the case of a high coolant temperature.

FIG. 4 is a time chart illustrating an example of processing performed in the case of a high coolant temperature. With reference to FIGS. 2 and 4, a part of processing performed at the time of starting up the vehicle will be described with time. To be specific, the processing from step S1 to step S6 and step S10 in FIG. 2 will be described with time.

At time point t0, the vehicle control unit 70 detects the operation to press the brake pedal and the operation of the start/stop button. The vehicle control unit 70 prepares for traveling between the time point t0 and the time point t1.

At time point t1, the vehicle control unit 70 confirms the connection of the contactor 58, and outputs a request for the battery power mode to the FC control unit 68 (step S1). The FC control unit 68 performs condition confirmation processing (step S2). At this time, the coolant temperature is equal to or higher than the predetermined value. Although not shown, it is assumed that there is no failure history of the drainage control and there is no gas shortage. In this case, the FC control unit 68 determines that the predetermined condition is met (step S3: YES). Therefore, processing for permitting the battery power mode is performed.

At time point t2, the FC control unit 68 confirms activation of the battery converter 60 and the FC converter 62. At this point in time, the FC control unit 68 outputs a valve-opening signal to the tank valve 36 (step S4). The tank valve 36 starts a valve opening operation in accordance with the valve opening signal. Further, the FC control unit 68 permits the battery power mode (step S5). From time point t2 to time point t3, the vehicle can travel by the electric power from the battery 56.

At time point t3, the tank valve 36 opens. At this time, the vehicle becomes ready for travelling by the electric power from the fuel cell 12.

At time point t4, for example, the user presses down the accelerator pedal. Then, the vehicle control unit 70 makes a request for the FC power generation to the FC control unit 68 (step S6: YES). The FC control unit 68 cancels the battery power mode and performs power generation control of the fuel cell 12 (step S10).

4-2 Processing Example 2

Figure 5:
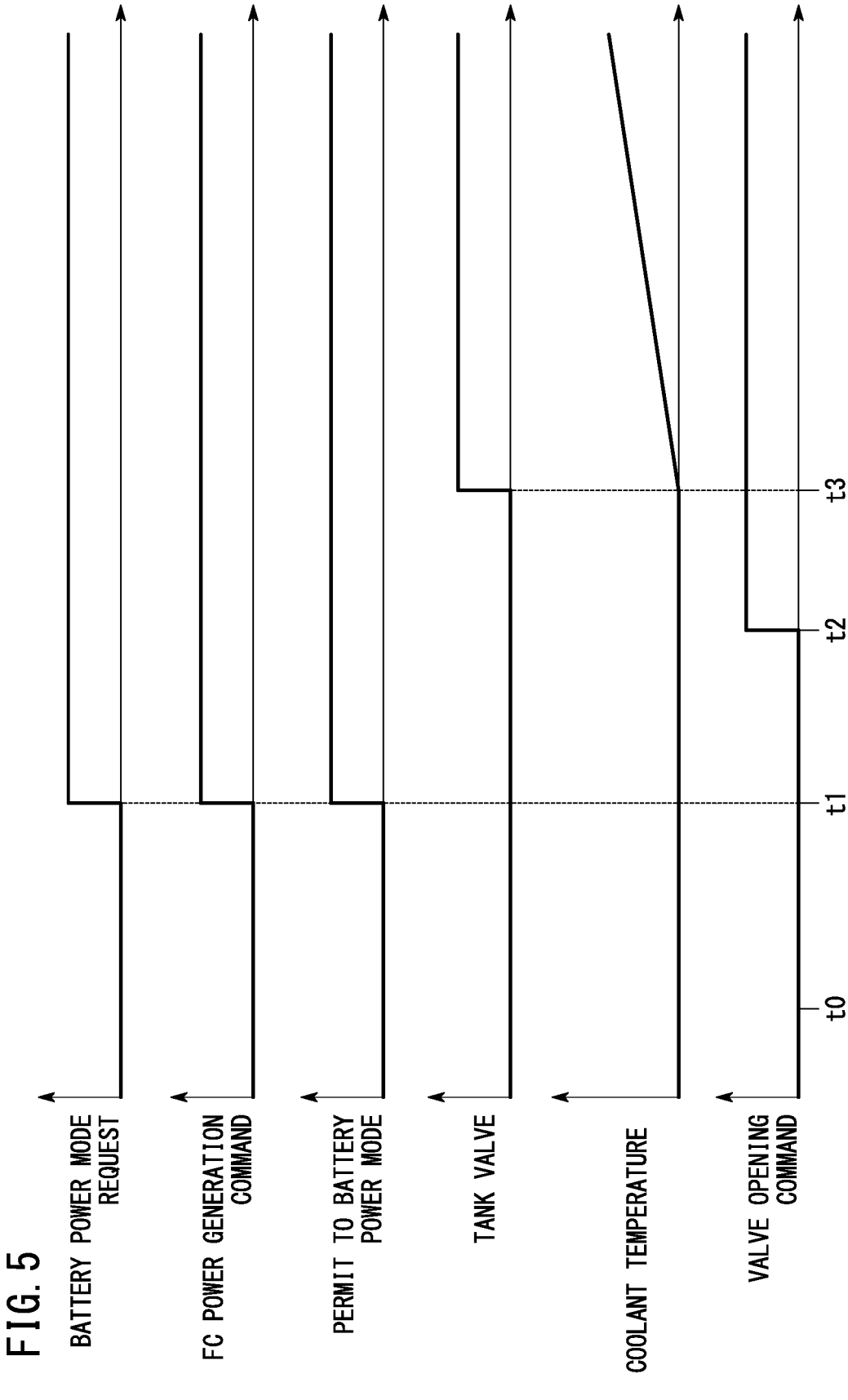
FIG. 5 is a time chart illustrating an example of processing performed in the case of a low coolant temperature.

FIG. 5 is a time chart illustrating an example of processing performed in the case of a low coolant temperature. With reference to FIGS. 2 and 5, a part of processing performed at the time of starting up the vehicle will be described with time. To be specific, the processing from step S1 to step S3 and step S7 to step S9 in FIG. 2 will be described with time.

At time point t0, the vehicle control unit 70 detects the operation to press the brake pedal and the operation of the start/stop button. The vehicle control unit 70 prepares for traveling between the time point t0 and the time point t1.

At time point t1, the vehicle control unit 70 confirms the connection of the contactor 58, and outputs a request for the battery power mode to the FC control unit 68 (step S1). The FC control unit 68 performs condition confirmation processing (step S2). At this point in time, the coolant temperature is below a predetermined value. In this case, the FC control unit 68 determines that the predetermined condition is not met (step S3: NO). The FC control unit 68 prohibits the battery power mode. The vehicle control unit 70 makes a request for the FC power generation to the FC control unit 68.

At time point t2, the FC control unit 68 confirms activation of the battery converter 60 and the FC converter 62. At this point in time, the FC control unit 68 outputs a valve-opening signal to the tank valve 36 (step S7). The tank valve 36 starts a valve opening operation in accordance with the valve opening signal.

At time point t3, the tank valve 36 opens. At this time, the vehicle can travel by the electric power from the fuel cell 12. The FC control unit 68 permits the vehicle to travel (step S8: YES, step S9).

5. Others

As the temperature of the fuel cell 12 decreases, the coolant temperature decreases. As indicated by the time point t4 in FIG. 4, the FC control unit 68 may cancel the battery power mode and perform the power generation control of the fuel cell 12 when the coolant temperature falls to or below the threshold.

6. Invention Obtained from Embodiments

The invention understood from the above embodiment will be described below.

The fuel cell system (10) according to an aspect of the present invention includes: the fuel cell (12) and the secondary battery (56) used as power sources for the power supply target object (52); and the control device (64) configured to control driving of the power supply target object, wherein the control device determines whether a predetermined condition required for activation of the fuel cell is satisfied, permits a battery-driven mode in which the power supply target object is driven using only the secondary battery when the predetermined condition is satisfied, and prohibits the battery-driven mode when the predetermined condition is not satisfied.

In the above configuration, it is determined whether or not a predetermined condition required for activation of the fuel cell is satisfied, and the battery-driven mode is permitted in the case where the predetermined condition is satisfied. According to the above configuration, the fuel cell can be started up when necessary. Therefore, convenience to the use after the power supply target object starts to be driven can be enhanced.

The fuel cell system according to the aspect of the present invention may further include: the gas container (24) configured to store the fuel gas to be supplied to the fuel cell; and the solenoid valve (36) configured to adjust opening and closing of the passage (26) between the gas container and the fuel cell, wherein the control device may instruct the solenoid valve to open in the case where the predetermined condition is satisfied, and permit the battery-driven mode before the solenoid valve completely opens.

According to the above configuration, the battery-driven mode can be set before completion of valve opening of the solenoid valve. As a result, the user can use the power supply target object more quickly. Thus, convenience to the use can be enhanced.

In an aspect of the present invention, the control device may determine that the predetermined condition is satisfied in the case where the time required for the activation of the fuel cell is equal to or shorter than a predetermined time.

If the secondary battery continues to be used in the state where the fuel cell is not activated, the SOC of the secondary battery may significantly decrease. According to the above configuration, it is possible to suppress a large decrease in the SOC of the secondary battery.

The fuel cell system according to the aspect of the present invention may further include the temperature acquisition device (50) configured to acquire a temperature of the fuel cell, and the control device may determine that the predetermined condition is not satisfied when the temperature of the fuel cell is equal to or lower than a predetermined value.

The temperature of the fuel cell at the activation of the fuel cell is related to the warm-up time required for the fuel cell. According to the present invention, it is possible to reduce a sense of discomfort experienced by the user.

In an aspect of the present invention, the control device may execute the maintenance control of the fuel cell in the situation where the power supply target object is not in operation, record a control history, and determine that the predetermined condition is not satisfied in the case where the fuel cell is to be activated from an operation-stopped state in a situation where the power supply target object is not in operation and the control history includes a failure history.

In an aspect of the present invention, the control device may cancel the battery-driven mode and control power generation by the fuel cell in the case where the control device receives the request for power generation by the fuel cell after the battery-driven mode is permitted.

There is a concern that the SOC of the secondary battery significantly decreases if the battery-driven mode is continued for a long time. According to the above configuration, it is possible to suppress a large decrease in the SOC of the secondary battery.

The present invention is not limited to the above disclosure, and various modifications are possible without departing from the essence and gist of the present invention.

The invention claimed is:

1. A fuel cell system comprising:
a fuel cell and a secondary battery used as power sources for a power supply target object; and
one or more processors that execute computer-executable instructions stored in a memory, wherein the one or more processors execute the computer-executable instructions to cause the fuel cell system to:
control driving of the power supply target object,
determine whether a predetermined condition required for activation of the fuel cell is satisfied,
permit a battery-driven mode, in which the power supply target object is driven using only the secondary battery, in a case where the predetermined condition is satisfied, and
prohibit the battery-driven mode in a case where the predetermined condition is not satisfied,
wherein the one or more processors cause the fuel cell system to:
execute a maintenance control of the fuel cell in a situation where the power supply target object is not in operation, and record a control history; and
determine that the predetermined condition is not satisfied in a case where the fuel cell is to be activated from an operation-stopped state in a situation where the power supply target object is not in operation and the control history includes a failure history.

2. The fuel cell system according to claim 1, further comprising:
a gas container configured to store a fuel gas to be supplied to the fuel cell; and
a solenoid valve configured to adjust opening and closing of a passage between the gas container and the fuel cell,
wherein the one or more processors cause the fuel cell system to:
instruct the solenoid valve to open in the case where the predetermined condition is satisfied, and permit the battery-driven mode before the solenoid valve completely opens.

3. The fuel cell system according to claim 1, wherein the one or more processors cause the fuel cell system to:
determine that the predetermined condition is satisfied in a case where a time required for the activation of the fuel cell is equal to or shorter than a predetermined time.

4. The fuel cell system according to claim 1, further comprising:
a temperature acquisition device configured to acquire a temperature of the fuel cell,
wherein the one or more processors cause the fuel cell system to:

determine that the predetermined condition is not satisfied in a case where the temperature of the fuel cell is equal to or lower than a predetermined value.

5. The fuel cell system according to claim 1, wherein the one or more processors cause the fuel cell system to:

cancel the battery-driven mode and control power generation by the fuel cell in a case where a request for the power generation by the fuel cell is acquired after the battery-driven mode is permitted.

\* \* \* \* \*